(12) United States Patent
Le Quere

(10) Patent No.: US 6,964,436 B2
(45) Date of Patent: Nov. 15, 2005

(54) COUPLER

(75) Inventor: Philippe Le Quere, Betton (FR)

(73) Assignee: Legris SA, Rennes (FR)

( * ) Notice: Subject to any disclaimer, the term of this patent is extended or adjusted under 35 U.S.C. 154(b) by 0 days.

(21) Appl. No.: 10/492,421

(22) PCT Filed: Oct. 17, 2002

(86) PCT No.: PCT/FR02/03559

§ 371 (c)(1),
(2), (4) Date: Apr. 12, 2004

(87) PCT Pub. No.: WO03/038329

PCT Pub. Date: May 8, 2003

(65) Prior Publication Data

US 2004/0262920 A1   Dec. 30, 2004

(30) Foreign Application Priority Data

Oct. 30, 2001  (FR) .................................. 01 4024

(51) Int. Cl.$^7$ ............................................. F16L 39/00
(52) U.S. Cl. ..................... 285/319; 285/340; 285/307
(58) Field of Search ............................. 285/307, 340, 285/319, 921

(56) References Cited

U.S. PATENT DOCUMENTS

| | | | | |
|---|---|---|---|---|
| 4,645,246 A * | 2/1987 | Guest | ........................ | 285/323 |
| 4,919,457 A * | 4/1990 | Moretti | ........................ | 285/39 |
| 4,951,391 A | 8/1990 | Seabra | | |
| 5,067,754 A * | 11/1991 | Bartholomew | ............... | 285/319 |
| 5,161,834 A * | 11/1992 | Norkey | ........................ | 285/319 |
| 5,171,045 A * | 12/1992 | Pasbrig | ........................ | 285/308 |
| 5,204,499 A * | 4/1993 | Favalora | ................... | 174/65 R |
| 5,314,216 A * | 5/1994 | Umezawa | ................... | 285/319 |
| 5,320,390 A * | 6/1994 | Kodama et al. | ............ | 285/308 |
| 5,487,572 A * | 1/1996 | Combot-Courrau et al. | ........................... | 285/308 |
| 5,711,550 A * | 1/1998 | Brandt | ........................ | 285/101 |
| 5,779,284 A * | 7/1998 | Guest | ........................ | 285/322 |
| 5,782,501 A * | 7/1998 | Brandt | ........................ | 285/81 |
| 5,855,399 A * | 1/1999 | Profunser | ................... | 285/305 |
| 5,887,911 A * | 3/1999 | Kargula | ...................... | 285/307 |
| 5,911,443 A * | 6/1999 | Le Quere | ....................... | 285/3 |
| 6,145,887 A * | 11/2000 | Cambot-Courrau | ............ | 285/4 |
| 6,173,999 B1 * | 1/2001 | Guest | ........................ | 285/323 |
| 6,183,022 B1 * | 2/2001 | Guest | ........................ | 285/322 |
| 6,312,019 B1 * | 11/2001 | Nakazumi et al. | ............ | 285/39 |
| 6,338,506 B1 * | 1/2002 | Kubota et al. | .............. | 285/319 |
| 6,499,771 B1 * | 12/2002 | Snyder et al. | .............. | 285/319 |
| 6,517,124 B1 * | 2/2003 | Le Quere | ................... | 285/340 |
| 6,783,161 B2 * | 8/2004 | Halama | ..................... | 285/308 |
| 6,824,172 B1 * | 11/2004 | Komolrochanaporn | ...... | 285/340 |

FOREIGN PATENT DOCUMENTS

| | | |
|---|---|---|
| EP | 0 723 103 | 7/1996 |
| FR | 2 640 723 | 6/1990 |

* cited by examiner

Primary Examiner—Eric K. Nicholson
(74) Attorney, Agent, or Firm—Young & Thompson

(57) ABSTRACT

A coupler having a tubular body (6) which is arranged to receive a tubular element for transporting fluid and including a pipe end, and which is provided with elements (11) for snap-fastening the tubular element, the coupler including a bushing (15) provided on the inside with elements (23, 25) for retaining the pipe end, which elements are selectively activatable and deactivatable, wherein the bushing is mounted in the tubular body to be movable axially between a position for activating the retaining elements and a position for deactivating the retaining elements, and wherein the bushing is provided with snap-fastening elements complementary to those of the body for co-operating therewith in the activation position.

20 Claims, 3 Drawing Sheets

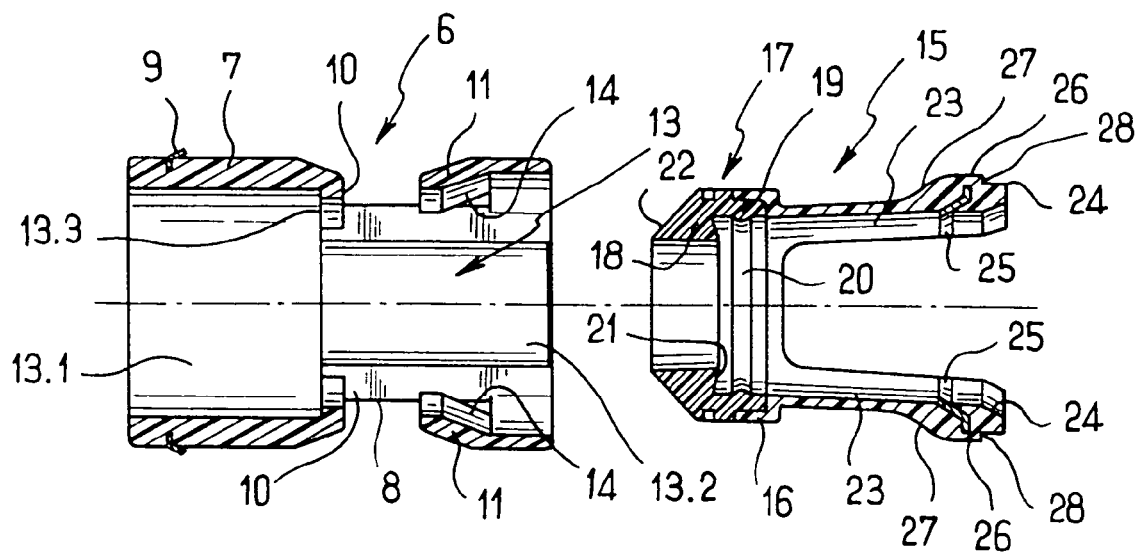
FIG_1
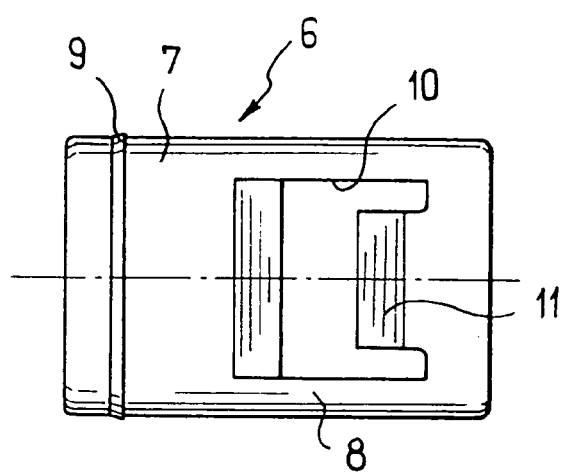
FIG_2
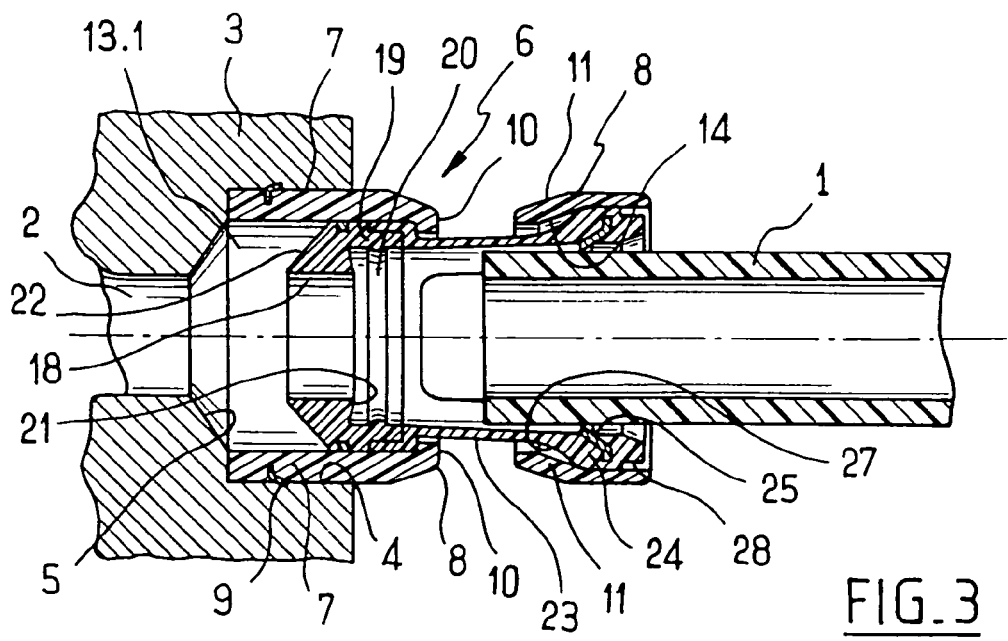
FIG_3

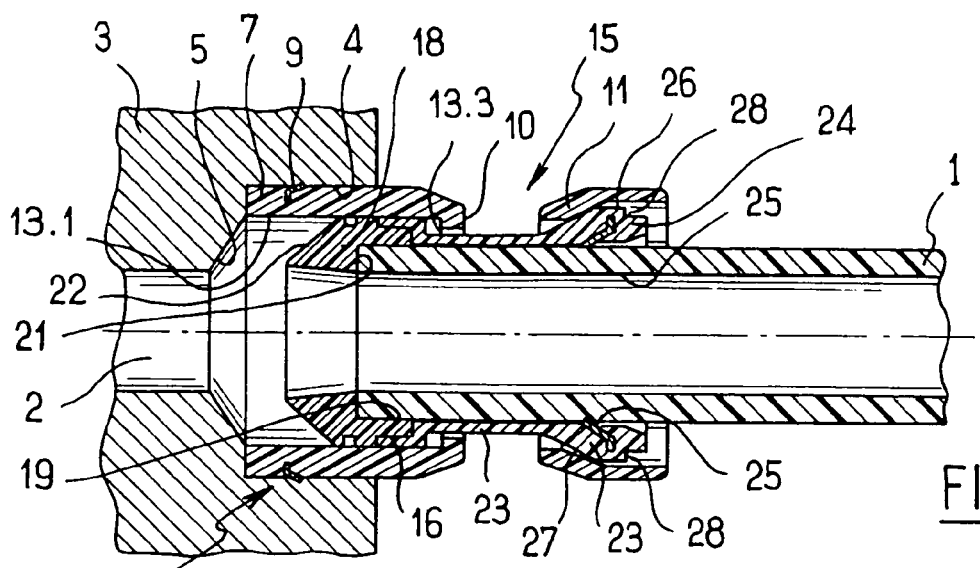
FIG_4
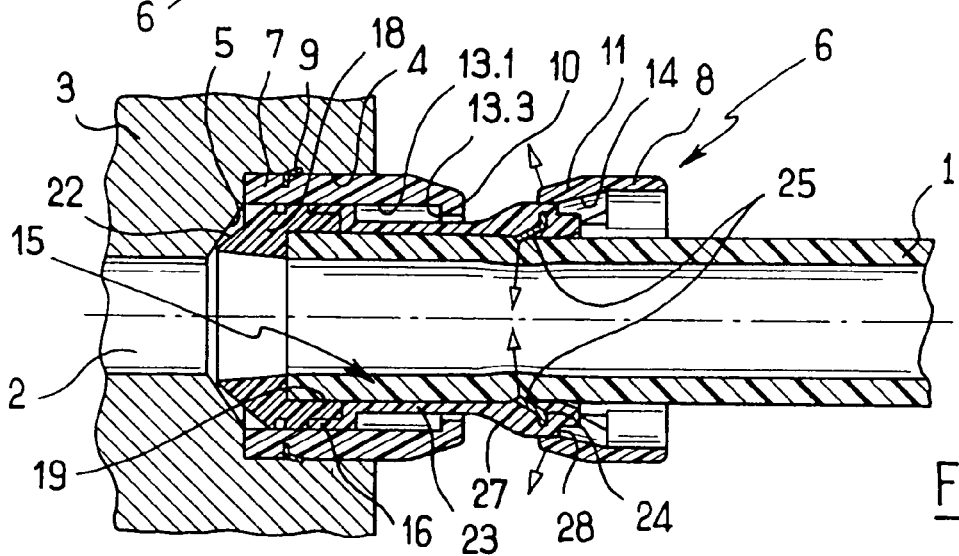
FIG_5
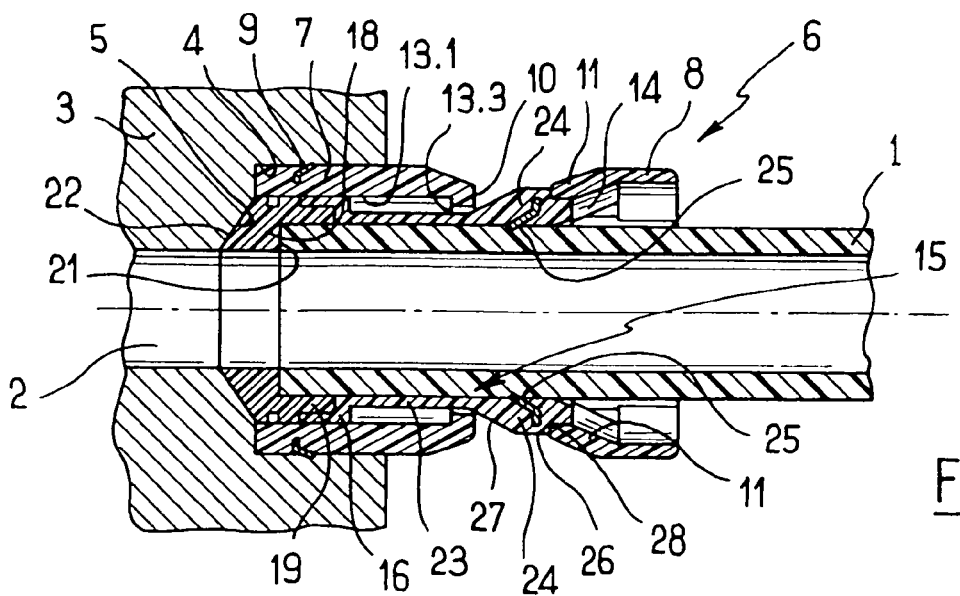
FIG_6

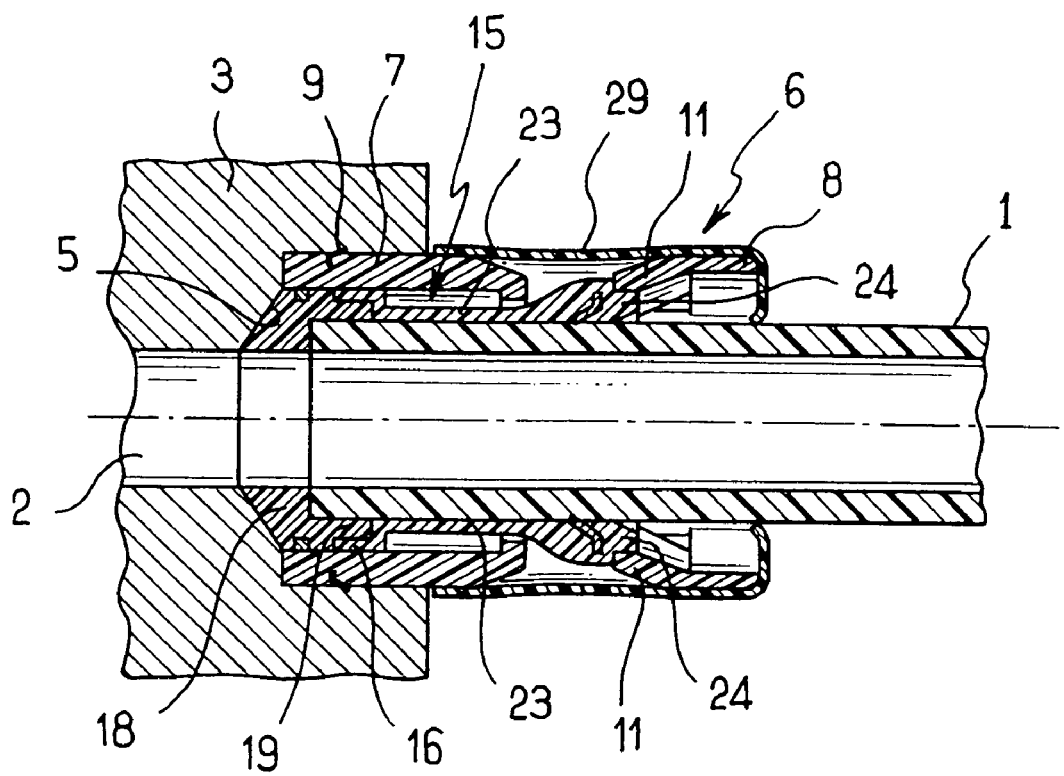
FIG_7
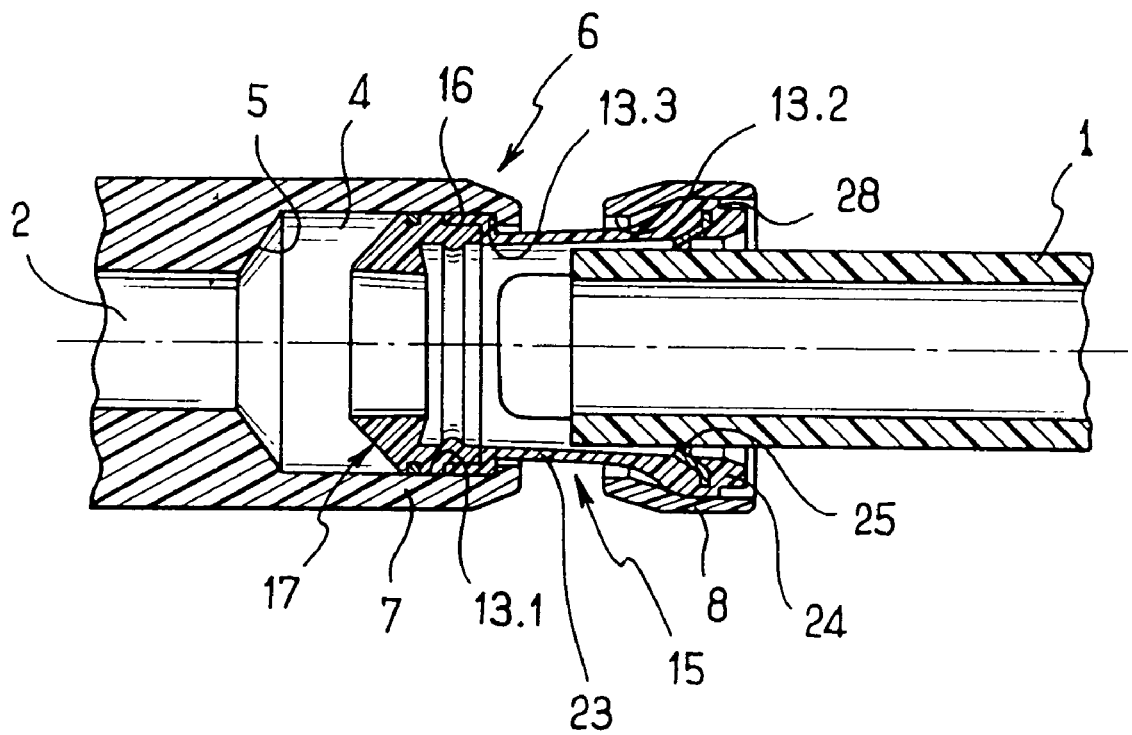
FIG_8

COUPLER

The present invention relates to a coupler for coupling together two fluid transport elements such as a pipe and a fluid receiver element such as a tank or a fluid transmitter element such as a pump.

BACKGROUND OF THE INVENTION

So-called "instant" or "quick" connection couplers are known that comprise a tubular body arranged to receive a pipe end and provided internally with means for retaining said pipe end. These means are generally constituted by a deformable washer whose inside circumference is subdivided into a plurality of teeth or claws which project into the tubular body. When the pipe end is inserted into the tubular body, the pipe end lifts the teeth so that their free ends come to rest against the outside surface of the pipe end. When pressure is raised in the circuit in which the coupler is installed, the pipe end moves back a little prior to the teeth coming to bite into the outside surface of the pipe end and serving to retain it. During insertion of the pipe end, the teeth which rub against the outside surface of the pipe end run the risk of scratching it.

Unfortunately, the coupling is generally sealed by means of an O-ring that fits tightly around the pipe end, such that scratches run the risk of constituting leakage zones or of damaging the sealing ring to such an extent that it can no longer perform its function. It would be possible to increase the flexibility of the washer in order to reduce the force exerted on the outside surface of the pipe end by the teeth. However that would also reduce the strength of retention and would increase the distance through which the pipe end moves backwards when pressure is applied to the circuit. Unfortunately, such backward movement produces a zone in which fluid is retained, which zone must be kept as small as possible, in particular in circuits that convey a liquid that is perishable.

Quick-connection couplers are also known comprising a tubular body having a latch mounted to move thereon radially between a locking position in which the latch possesses a portion projecting into the tubular body, and an unlocking position in which said portion is retracted from the tubular body. The risks of the pipe end being scratched or moving backwards are then small. However, it is necessary to provide a setback either directly in the pipe end or in an endpiece mounted on the pipe end in order to co-operate with the latch of the coupler.

OBJECTS AND SUMMARY OF THE INVENTION

An object of the invention is to propose a coupler that combines in simple manner the advantages of the above-mentioned prior art couplers.

In order to achieve this object, the present invention provides a coupler comprising a tubular body which is arranged to receive a tubular element for transporting fluid and including a pipe end, and which is provided with means for snap-fastening the tubular element, the coupler comprising a bushing provided on the inside with means for retaining the pipe end, which means are selectively activatable and deactivatable, the bushing being mounted in the tubular body to be movable axially between a position for activating the retaining means and a position for deactivating the retaining means, and the bushing being provided with snap-fastening means complementary to those of the body for co-operating therewith in the activation position.

Thus, the bushing serves as an interface between the snap-fastening means of the tubular body and the pipe end, and serves to retain the pipe end when it is in the activation position while insertion or removal of the pipe end is left free when the bushing is in its deactivation position.

Preferably, the bushing is provided internally with abutment means against insertion of the pipe end into the bushing, and the activation position of the bushing is downstream from the deactivation position relative to the direction in which the pipe end is inserted into the coupler.

Thus, when the pipe end is inserted into the tubular body, the bushing is entrained from its deactivation position to its activation position. The coupler thus constitutes a quick coupler.

In which case, advantageously, the bushing possesses a downstream end provided with an elastically-deformable annular gasket having an internal annular shoulder forming the abutment against insertion of the pipe end.

Under such circumstances, the annular sealing ring serves not only to perform its conventional sealing function, but also to perform an abutment function against further penetration of the pipe end into the bushing, and a function of compensating for the pipe end moving back when the circuit in which the coupler is installed is put under pressure. This makes it possible to limit the formation of fluid-retaining zones.

BRIEF DESCRIPTION OF THE DRAWINGS

Other characteristics and advantages of the invention appear on reading the following description of particular, non-limiting embodiments of the invention.

Reference is made to the accompanying figures, in which:

FIG. 1 is an exploded longitudinal section view of a cartridge-type coupler in accordance with the invention;

FIG. 2 is an elevation view of the tubular body of said coupler;

FIGS. 3 to 6 are longitudinal section views of this cartridge-type coupler installed in a member of a fluid transport circuit, showing the various stages of inserting a pipe end;

FIG. 7 is a view analogous to FIG. 6 showing a variant embodiment of the coupler; and FIG. 8 is a view analogous to FIG. 3 showing a union-type coupler in accordance with the invention.

MORE DETAILED DESCRIPTION

With reference to FIGS. 1 to 7, the coupler in accordance with the invention is for coupling a pipe end 1 to the internal channel 2 of a member 3, which channel opens to the outside of the member 3 via a countersunk chamber 4 presenting a diameter greater than the diameter of the internal channel 2 and connected thereto via a tapering surface 5.

The coupler comprises a generally tubular body referenced 6 made of thermoplastic material. The tubular body 6 possesses one end portion 7 for insertion into the chamber 4 of the member 3 and an opposite end portion 8 for projecting from the member 3.

The end portion 7 is provided with means for anchoring it in the chamber 4. In this example, these means are implemented in the form of a metal cramping washer 9 partially embedded in the tubular body so that the outer periphery of the cramping washer 9 projects radially outwards from the end portion 7.

The end portion 8 has two diametrally-opposite openings 10. In each opening 10, a tab 11 extends from a portion of the edge of the opening 10 opposite from the end portion 7 so that its free end projects into the corresponding section of the internal channel of the tubular body 6, which internal channel is given overall Reference 13. Each tab 11 presents an inside surface 14 sloping relative to the central axis of the tubular body 1 so as to form ramps, as explained below.

The internal channel 13 of the tubular body 6 is subdivided axially into two sections 13.1 and 13.2. Section 13.1 is situated beside the end portion 7 and possesses a diameter greater than that of the section 13.2 which extends beside the end portion 8 and which is connected to the section 13.1 via a shoulder 13.3.

The internal channel 13 receives a bushing given overall reference 15.

The bushing 15 comprises an annular portion 16 slidably received in the section 13.1 of the internal channel 13, and it possesses two opposite ends.

One of these ends is provided with an abutment element of flexible material, in this case a sealing gasket given general reference 17 and made of an elastically-deformable material such as an elastomer. The sealing gasket 17 comprises a ring 18 of outside diameter that is slightly greater than the diameter of the section 13.1 and of inside diameter that is substantially equal to the inside diameter of the pipe end 1, and a collar 19 having an inside diameter substantially equal to the outside diameter of the pipe end 1 and an outside diameter substantially equal to the inside diameter of the above-mentioned end of the annular portion 16, the collar 19 being received in said end. The collar 19 also presents an internal bead 20 of annular shape and of diameter smaller than the outside diameter of the pipe end 1. The inside surface of the collar 19 is connected to the inside surface of the ring 18 via a shoulder 21 formed by a convex frusto-conical surface. The ring 18 possesses an end face 22 opposite from the collar 19 and of convex tapering shape corresponding substantially to the shape of the surface 5 of the member 3.

Starting from the end of the annular portion 16 remote from the sealing gasket 17, there are two arms 23 extending axially and each presenting a cross-section in the form of a circular arc. Each of these arms 23 has a free end 24 which is provided on the inside with means for retaining the pipe end 1. In this case, the retaining means are constituted by respective metal spikes 25 partially embedded in the free ends 24 so as to project radially inwards. The arms 23 are elastically deformable between a rest state in which the spikes 25 define a passage of diameter slightly greater than the outside diameter of the pipe end 1, and a deformed state in which the spikes 25 define a passage of diameter slightly smaller than the outside diameter of the pipe end 1. The free ends 24 have respective outside surfaces 26 presenting respective ramps 27 for co-operating with the inside surfaces 14 of the resilient tabs 11, and respective steps 28 for coming into abutment against the free ends of the resilient tabs 11.

The bushing 15 is made by injecting two materials;

The bushing 15 is movable between a position in which the retaining means are deactivated (see FIG. 3) and a position in which the retaining means are actuated (see FIG. 6), as described in greater detail below.

The coupler is properly installed in the member 3 when the end portion 7 is anchored in the chamber 4 (FIG. 3).

In a disconnection state, the bushing 15 is in its deactivation position (FIG. 3).

When the pipe end 1 is inserted into the bushing 15, it comes into abutment with the shoulder 21 and entrains the bushing 15 towards the internal passage 2. The ramps 27 on the free ends 24 then encounter the sloping surfaces 14 of the tabs 11, thereby deforming the arms 23 from their rest state towards their deformed state (FIGS. 4 and 5).

When the steps 28 goes past the free ends of the tabs 11, the arms 23 move apart a little so that the steps 28 face the free ends of the tabs 11. The bushing 15 is then in its activation position and the tabs 11 constitute abutments against extraction of the bushing 15 from its activation position. In addition, the tabs 11 hold the arms 23 in a deformed state in which the spikes 25 bite into the outside surface of the pipe end (FIG. 6). At this stage, the ring 18 is compressed between the tapering surface 5 of the member 3 and the end face of the pipe end 1, and exerts a reaction force on the bushing 15, holding the steps 28 pressed against the free ends of the tabs 11.

Proper connection is indicated by an audible click caused by steps 28 coming suddenly into contact with the free ends of the tabs 11. The appearance of the ends 24 in the openings 10 also informs the operator that the connection has been made.

When the circuit in which the coupler is installed is put under pressure, the fluid exerts radial pressure on the sealing gasket 17 via the inside surface of the ring 18. This pressure is converted into axial forces on the pipe end 1 and on the bushing 15, thereby improving contact and thus improving sealing, while subjecting retention of the pipe end to little force, given the small area on which the pressure acts.

Disconnection is achieved by pressing on the free ends 24 of the arms 23 through the openings 10 so as to enable the steps 28 to escape from the free ends of the tabs 11, while simultaneously exerting traction on the pipe end 1. It should be observed that the ability of the pipe end 1 to withstand flattening and the elasticity of the arms 23 act to oppose the thrust applied by the operator on the end 24 during disconnection, thereby further reducing the risk of disconnection taking place accidentally. In addition, the need to act simultaneously on both arms 23 further limits any risk of accidental disconnection.

The steps 28 then escape from the free ends of the tabs 11, and the pipe end 1 together with the bushing 15 can be moved backwards until the annular portion 16 of the bushing 15 comes into abutment against the shoulder 13.3 between the sections 13.1 and 13.2, which shoulder 13.3 defines the deactivation position of the bushing.

In a variant, as shown in FIG. 7, it is possible to cover the end portion 8 in a flexible cap 29 enabling the coupler to be isolated from the external environment. This cap 29 is preferably made of an elastically-deformable material so as to make it possible to perform disconnection operations without it being necessary to remove the cap 29.

The invention is also applicable to couplers of the union type as used for coupling together two pipe ends.

FIG. 8 shows one-half of the coupler, the other half being identical thereto.

The internal passage 2, the tapering surface 5, and the chamber 4 are then made directly in the end portion 7 of the tubular body 6, the chamber 4 extending the section 13.1 of the internal channel 13 of the tubular body 6. The bushing 15 is identical to the bushing in the above-described embodiment.

Naturally, the invention is not limited to the embodiment described, and variants may be applied-thereto without going beyond the ambit of the invention as defined by the claims.

In particular, instead of the sealing gasket, the abutment means may comprise an internal shoulder secured to the bushing downstream from the retaining means relative to the direction in which the pipe end is inserted, and preferably the internal shoulder is made of a flexible material.

In addition, other snap-fastening means can be used, such as a latch mounted on the body to move radially between a locking position in which the latch has a portion engaged in a groove in the bushing, and an unlocking position in which said portion is disengaged from the groove.

What is claimed is:

1. A coupler comprising:
   a tubular body (6) which is arranged to receive a tubular element for transporting fluid and including a pipe end;
   a bushing (15);
   retaining means (23, 25) to retain the pipe end of the tubular element, the retaining means being provided along an inside surface of the bushing;
   snap means (11) to snap-fasten an outer portion of the bushing, the snap means provided on the tubular body,
   which retaining means comprise a tooth for spiking into the pipe end and are selectively activatable and deactivatable,
   wherein the bushing is mounted in the tubular body to be movable axially between a position for activating the retaining means and a position for deactivating the retaining means, and
   wherein the bushing is provided with snap-fastening means complementary to those of the body for co-operating therewith in the activation position.

2. A coupler according to claim 1, in which the bushing (15) is provided internally with abutment means (21) against insertion of the pipe end into the bushing, and wherein the activation position of the bushing is downstream from the deactivation position relative to the direction in which the pipe end is inserted into the coupler.

3. A coupler according to claim 2, in which the abutment means comprise an internal shoulder (21) secured to the bushing (15) downstream from the retaining means (23, 25) relative to the pipe end insertion direction.

4. A coupler according to claim 3, in which the internal shoulder (21) is made of a flexible material.

5. A coupler according to claim 4, in which the bushing possesses a downstream end provided with an elastically-deformable annular gasket (17) having an internal annular shoulder (21) forming the abutment against insertion of the pipe end.

6. A coupler according to claim 5, wherein the annular gasket (17) possesses an end face (22) remote from the shoulder (21) and arranged to co-operate with a corresponding surface (5) of the body (6).

7. A coupler according to claim 6, in which the end face (22) is of convex tapering shape.

8. A coupler according to claim 3, in which the internal shoulder (21) is of convex tapering shape.

9. A coupler according to claim 1, in which the retaining means comprise at least one arm (23) extending axially and having an end secured to the bushing (15) and a free end (24) provided internally with the tooth (25) for spiking into the pipe end, the arm being elastically deformable between a first state in which the spiking tooth is retracted from the bushing and a second state in which the spiking tooth projects into the bushing.

10. A coupler according to claim 9, in which the free end (24) of the arm (23) is arranged to co-operate with an edge of an opening (10) of the tubular body to hold the bushing (15) in its activation position and to hold the arm (23) in its second state.

11. A coupler comprising:
    a tubular body (6) arranged to receive a pipe end of a tubular element for transporting fluid;
    a bushing (15);
    retaining means (23, 25) to retain the pipe end of the tubular element, the retaining means being provided along an inside surface of the bushing;
    snap means (11) to snap-fasten an outer portion of the bushing, the snap means provided on the tubular body;
    the retaining means being selectively activatable and deactivatable, wherein,
    the bushing is mounted in the tubular body to be movable axially between a position for activating the retaining means and a position for deactivating the retaining means,
    the bushing is provided with snap-fastening means complementary to the snap means (11) of the tubular body for co-operating therewith in the activation position,
    the bushing (15) is provided internally with abutment means (21) against insertion of the pipe end into the bushing, and
    the activation position of the bushing is downstream from the deactivation position relative to the direction in which the pipe end is inserted into the coupler.

12. A coupler according to claim 11, in which the abutment means comprise an internal shoulder (21) secured to the bushing (15) downstream from the retaining means (23, 25) relative to the pipe end insertion direction.

13. A coupler according to claim 12, in which the internal shoulder (21) is made of a flexible material.

14. A coupler according to claim 13, in which the bushing possesses a downstream end provided with an elastically-deformable annular gasket (17) having an internal annular shoulder (21) forming the abutment against insertion of the pipe end.

15. A coupler according to claim 14, wherein the annular gasket (17) possesses an end face (22) remote from the shoulder (21) and arranged to co-operate with a corresponding surface (5) of the body (6).

16. A coupler according to claim 15, in which the end face (22) is of convex tapering shape.

17. A coupler according to claim 12, in which the internal shoulder (21) is of convex tapering shape.

18. A coupler according to claim 11, in which the retaining means comprise at least one arm (23) extending axially and having an end secured to the bushing (15) and a free end (24) provided internally with a tooth (25) for spiking into the pipe end, the arm being elastically deformable between a first state in which the spiking tooth is retracted from the bushing and a second state in which the spiking tooth projects into the bushing.

19. A coupler according to claim 18, in which the free end (24) of the arm (23) is arranged to co-operate with an edge of an opening (10) of the tubular body to hold the bushing (15) in its activation position and to hold the arm (23) in its second state.

20. A coupler comprising:
    a tubular body (6) arranged to receive a pipe end of a tubular element for transporting fluid;
    a bushing (15);
    a retaining means (23, 25) with a tooth for spiking into the pipe end to retain the pipe end of the tubular element, the retaining means provided inside the bushing, the retaining means being selectively activatable and deactivatable;
    a first snap element (11) to snap-fasten an outer portion of the bushing, the first snap element provided on the tubular body for co-operating therewith in the activation position; and a second snap element provided on the bushing, the second snap element being complementary to the first snap element, wherein the bushing is mounted in the tubular body to be movable axially between a position for activating the retaining means and a position for deactivating the retaining means.

* * * * *